US012742697B2

(12) United States Patent
Hnat

(10) Patent No.: US 12,742,697 B2
(45) Date of Patent: Sep. 22, 2026

(54) MEDICAL GAS SEPARATOR

(71) Applicant: Nicholas B. Hnat, Parma, OH (US)

(72) Inventor: Nicholas B. Hnat, Parma, OH (US)

( * ) Notice: Subject to any disclaimer, the term of this patent is extended or adjusted under 35 U.S.C. 154(b) by 443 days.

(21) Appl. No.: 18/350,231

(22) Filed: Jul. 11, 2023

(65) Prior Publication Data

US 2024/0053217 A1 Feb. 15, 2024

Related U.S. Application Data

(60) Provisional application No. 63/396,824, filed on Aug. 10, 2022.

(51) Int. Cl.
*G01M 3/02* (2006.01)

(52) U.S. Cl.
CPC .................................. *G01M 3/022* (2013.01)

(58) Field of Classification Search
None
See application file for complete search history.

(56) References Cited

U.S. PATENT DOCUMENTS 2,271,282 A * 1/1942 Young ..................... F16K 3/312 251/328
5,287,730 A * 2/1994 Condon ................ G01M 3/022 73/49.8
5,582,211 A * 12/1996 Monson ................ F16L 55/105 138/42
2014/0332192 A1* 11/2014 Cosby, II ................. B23K 1/20 165/177
2017/0030470 A1* 2/2017 Al-Amri ................... F16K 3/06
2018/0080581 A1* 3/2018 Mitchell ........... A61M 16/0833

* cited by examiner

*Primary Examiner* — Mark A Shabman

(57) ABSTRACT

A medical gas separator for testing for leaks on a medical gas delivery system. The separator can be used to selectively fluidly join or separate an upstream portion and a downstream portion of the medical gas delivery system for testing for leaks on the downstream portion while the upstream portion can remain in use. The separator includes an upstream element connected to the upstream portion, a downstream element connected to the downstream element, and either a spacer element or a blanking element arranged therebetween. The separator is convertible between a first configuration that fluidly joins the upstream and downstream portions, and a second configuration that fluidly separates the upstream and downstream portions. The separator is convertible between each configuration by switching out the spacer element with the blanking element.

13 Claims, 5 Drawing Sheets

100
104
6
22
4
18

26
10
16
12
74
30
30
30
30
90
20
2
24
8
106
102

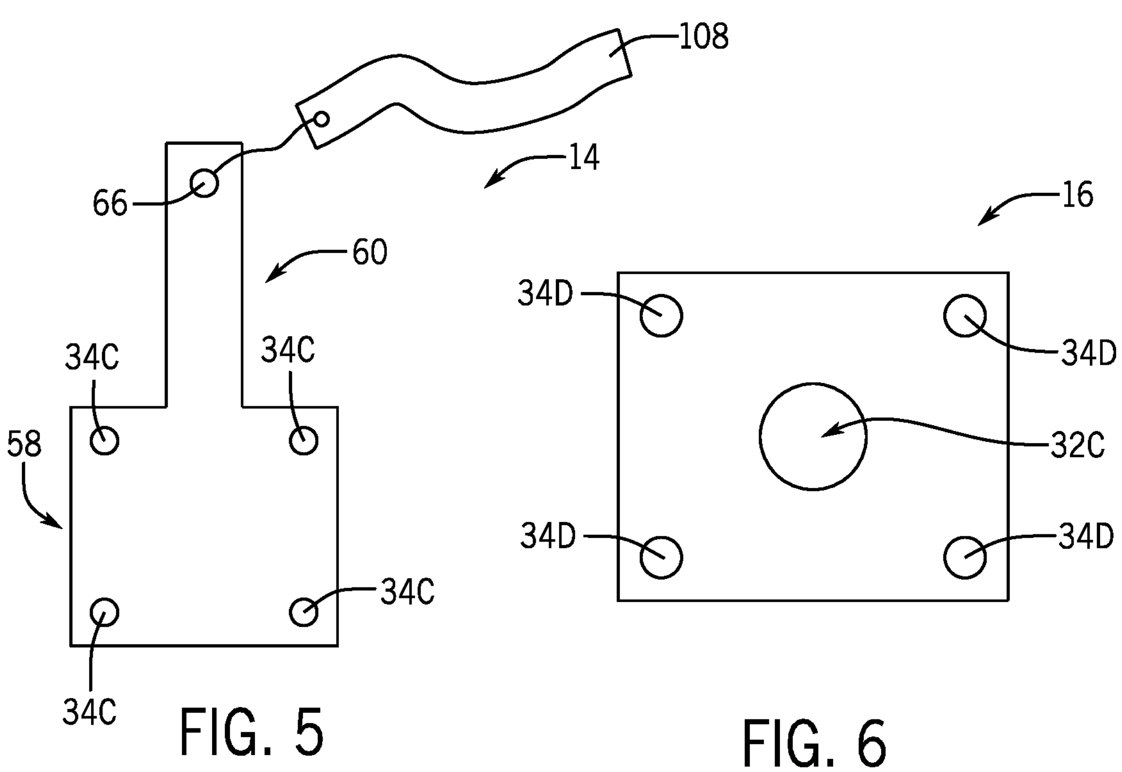
FIG. 5
FIG. 6
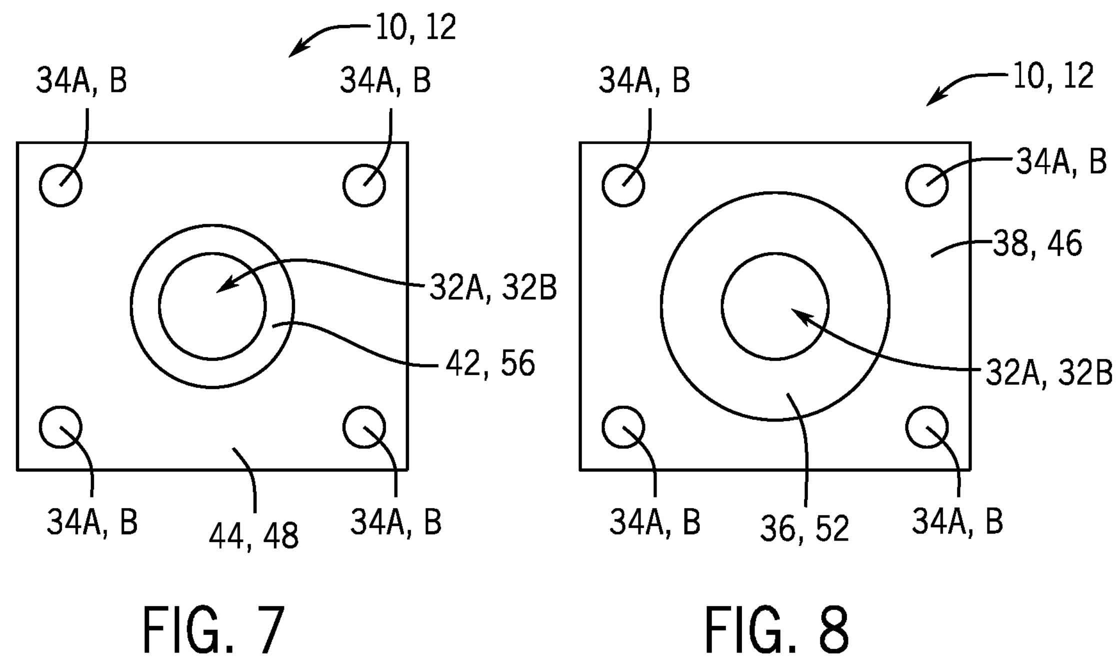
FIG. 7
FIG. 8

MEDICAL GAS SEPARATOR

CROSS REFERENCE TO RELATED APPLICATION

This application claims priority to U.S. Provisional Patent Application Ser. No. 63/396,824 filed Dec. Aug. 10, 2022, which is expressly incorporated herein by reference.

BACKGROUND

In medical gas systems, which are governed by Health Care Facilities Code NFPA 99, every new or renovated gas supply system has to be tested for 24 hours with nitrogen test gas at a gas pressure of 150 pounds per square inch (PSI) to test for leaks. However, normal operating pressure for $O_2$, nitrous oxide, or other medical service gases in these medical gas supply systems is around 50 PSI. The pressure differential between the part of the system under test and the part of the system still in service creates a possibility that the test gas may leak "past" (e.g. through) the valve and may contaminate the part of the system still in service. Therefore, in testing patient service gas systems for leaks, gas valves in the system cannot simply be closed to test downstream components for leaks because the 150 PSI nitrogen test gas might leak upstream through the closed valve and then enter into the upstream components of the patient service gas system and contaminate the patient service $O_2$ gas with the nitrogen test gas.

Therefore, when testing new or renovated components in such a system, a gas line (also referred to herein as "pipe") in the system, which is usually copper, is cut and capped on both sides of the cut to isolate the downstream portion (also referred to herein as "patient side") of the system from the upstream portion (also referred to herein as "supply side") of the system.

During this process, a cut is made in the gas line downstream of a closed valve. Braze tails are brazed to the patient side and the supply side of the cut pipe with couplings. A cap is sealed on the patient side braze tail, and another cap may be sealed on the supply side braze tail. The patient side braze tail also has a fitting installed thereon (e.g. a ⅛" npt tapped through bore) for connecting a pressure/gas testing device or purge rig to the patient side. This fitting is for putting $N_2$ test gas in the patient side, and is also for evacuating $O_2$ from the patient side so no oxide is formed on the inside of patient side pipe during brazing, which brazing is used for connections made for testing/installation of medical gas supply systems. Because of this physical separation of the patient side from the supply side, a test of the patient side of the system may therefore be conducted with no risk of nitrogen test gas entering the supply side of the system.

After the testing of the patient side for 24 hours with nitrogen gas at 150 PSI, the brazing tails, caps, and fittings are removed, and the patient side and supply side are re-connected together with a coupling so service gas can be supplied to the patient side.

The process of cutting the pipe, capping the upstream and downstream portions of the system, and reconnecting the patient side with the supply side is time consuming and arduous because many individual brazings are used to make these multiple connections and reconnections. Therefore, improvements in the process and components used for testing medical gas supply systems are desired.

BRIEF DESCRIPTION

According to one aspect, a separator system includes an upstream element including a first fluid conduit, a downstream element including a second fluid conduit, a spacer element including a third fluid conduit, and a blanking element. The separator system is convertible between a first configuration and a second configuration. The first configuration includes the upstream element, the downstream element, and the spacer element arranged between and connected to the upstream element and the downstream element such that the third fluid conduit fluidly connects the first and second fluid conduits. The second configuration includes the upstream element, the downstream element, and the blanking element arranged between and connected to the upstream element and the downstream element such that the blanking element fluidly isolates the first fluid conduit from the second fluid conduit.

In another aspect, a fluid transport system includes an upstream portion, a downstream portion, and a separator system. The separator system includes an upstream element including a first fluid conduit, a downstream element including a second fluid conduit, a spacer element including a third fluid conduit, and a blanking element. The separator system is convertible between a first configuration and a second configuration. The first configuration includes the upstream element, the downstream element, and the spacer element arranged between and connected to the upstream element and the downstream element such that the third fluid conduit fluidly connects the first and second fluid conduits. The second configuration includes the upstream element, the downstream element, and the blanking element arranged between and connected to the upstream element and the downstream element such that the blanking element fluidly isolates the first fluid conduit from the second fluid conduit. The upstream element is connected to the upstream portion. The downstream element is connected to the downstream portion. The first configuration fluidly connects the upstream portion with the downstream portion. The second configuration fluidly isolates the upstream portion from the downstream portion.

In another aspect, a method of operating a fluid transport system is provided. The fluid transport system includes an upstream portion, a downstream portion, and a separator system arranged between the upstream portion and the downstream portion. The separator system includes an upstream element including a first fluid conduit, a downstream element including a second fluid conduit, a spacer element including a third fluid conduit, and a blanking element. The separator system is convertible between a first configuration and a second configuration. The first configuration includes the upstream element, the downstream element, and the spacer element arranged between and connected to the upstream element and the downstream element such that the third fluid conduit fluidly connects the first and second fluid conduits. The second configuration includes the upstream element, the downstream element, and the blanking element arranged between and connected to the upstream element and the downstream element such that the blanking element fluidly isolates the first fluid conduit from the second fluid conduit. The method includes putting the separator system into the second configuration to thereby prevent a fluid within the upstream portion from being transported through the second configuration to the downstream portion.

BRIEF DESCRIPTION OF THE DRAWINGS

FIG. 5 is a front elevation view of a blanking element according to the present subject matter.

FIG. 6 is a front elevation view of a spacer element according to the present subject matter.

FIG. 7 is an elevation view of upstream and downstream elements according to the present subject matter.

FIG. 8 is an elevation view of upstream and downstream elements according to the present subject matter.

DETAILED DESCRIPTION

Figure 1:
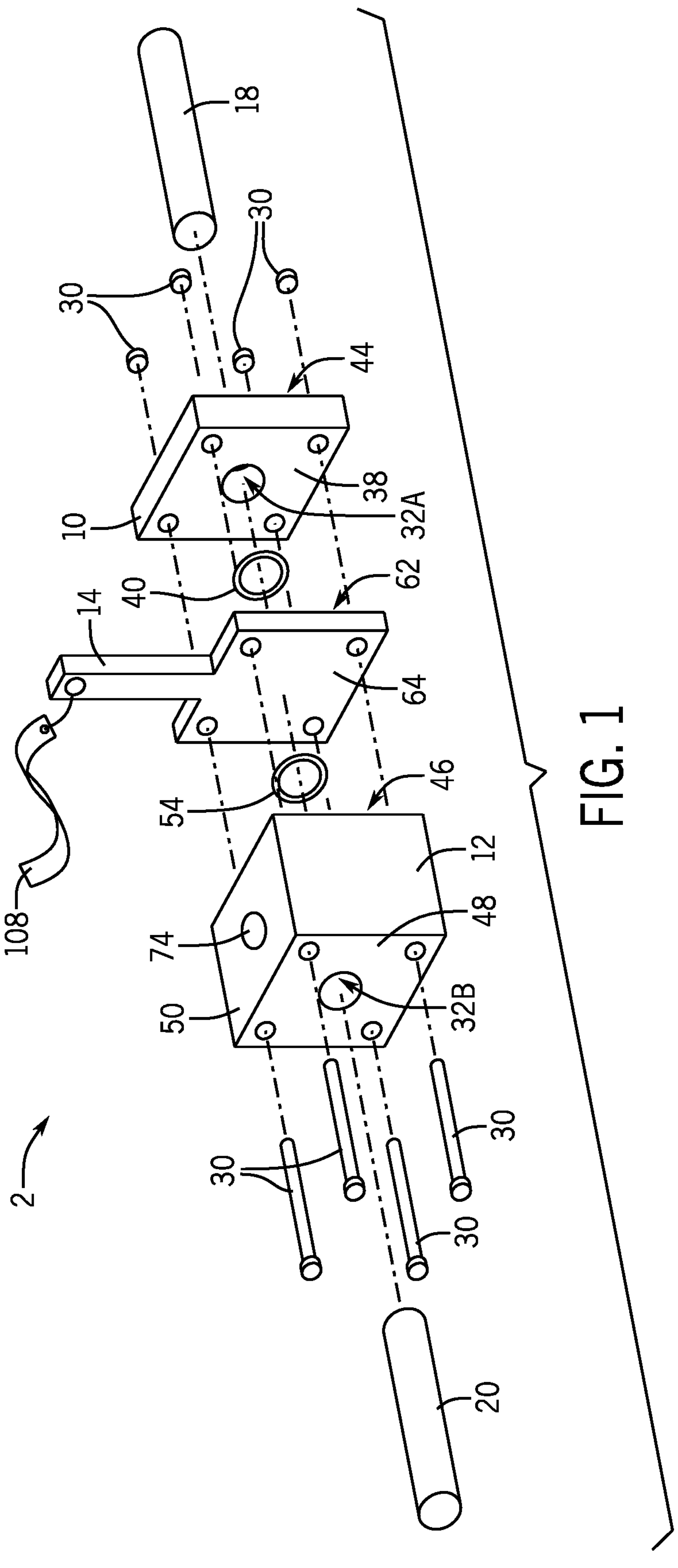
FIG. 1 is an exploded view of a separator system in a second configuration according the present subject matter.

A medical gas separator for testing for leaks on a medical gas delivery system is provided. The separator can be used to selectively fluidly join or fluidly separate an upstream portion and a downstream portion of the medical gas delivery system for testing for leaks on the downstream portion while the upstream portion can remain in use. The separator includes an upstream element connected to the upstream portion, a downstream element connected to the downstream portion, and either a spacer element or a blanking element arranged therebetween. The separator is convertible between a first configuration that fluidly joins the upstream and downstream portions, and a second configuration that fluidly separates the upstream and downstream portions. The separator is convertible between each configuration by switching out the spacer element with the blanking element.

Referring to the drawings, a separator system 2 is included in a fluid system 4 (also referred to herein as "medical gas supply system"), and is used to selectively fluidly connect or fluidly separate two portions of the fluid system 4, e.g. an upstream portion 6 (also referred to herein as "supply side") and a downstream portion 8 (also referred to herein as "patient side") are fluidly isolated from each other by the second configuration. At an upstream side 100, the separator system 2 may be connected to the supply side 6 of the fluid system 4.

The separator system 2 includes an upstream element 10, a downstream element 12, a blanking element 14, a spacer element 16, and optionally an upstream braze tail 18 and a downstream braze tail 20.

At a downstream side 102, the separator system 2 may be connected to the patient side 8 of the fluid system 4. The separator system 2 may be introduced into the fluid system 4 at any time, including during an initial construction of the fluid system 4 or at any point subsequent to construction of the fluid system 4, such as when there is a desire to test the downstream portion 8 for fluid leaks, e.g. when modification or additions are made to the fluid system 4.

Fluid System

The fluid system 4, also referred to herein as "fluid transport system" or "medical gas supply system", in which the separator system 2 is incorporated, may be used for the delivery/transport of a fluid or composition including a fluid, such as a gas (e.g. a medical gas), liquid, slurry, suspension, or combinations thereof, from one location to another. In a non-limiting embodiment, the fluid is a medical gas, e.g. a gas including $O_2$. The fluid system 4 may include a fluid supply or source, a fluid outlet for providing the fluid to a user, and one or more fluid conduits (e.g. pipes) connecting the fluid supply to the fluid outlet. The fluid supply may include a pump or pressurize fluid source that provides a force (pressure) that moves the fluid through the conduit from one location to another. The fluid system may include various size diameter pipe as the conduit, e.g. ½", ¾", or even up to 6" or 8" pipe or bigger or smaller.

The fluid system 4 may be a medical gas supply system, and thus is also referred to herein as such, and may supply a service gas such as $O_2$ as the fluid. The medical gas supply system 4 may include a gas source 104, a gas outlet 106, and one or more pipes for transporting the gas from the gas source to the gas outlet. The system 4 may be used for the delivery of oxygen or other service gases through the pipe(s) from the gas source to the gas outlet, and these service gases may be for medical use such as patient use in a hospital or other venue.

When the upstream portion 6 and the downstream portion 8 of the fluid system 4 are fluidly connected by the separator system 2, the upstream portion 6 and the downstream portion 8 are in fluid communication with each other so that the fluid can be transmitted through the separator system 2 between the upstream portion 6 and the downstream portion 8. When fluidly separated/isolated from each other by the separator system 2, the upstream portion 6 and the downstream portion 8 are not in fluid communication with each other, wherein the fluid cannot be transmitted through the separator system 2 between the upstream portion 6 and the downstream portion 8.

Separator System

Figure 2:
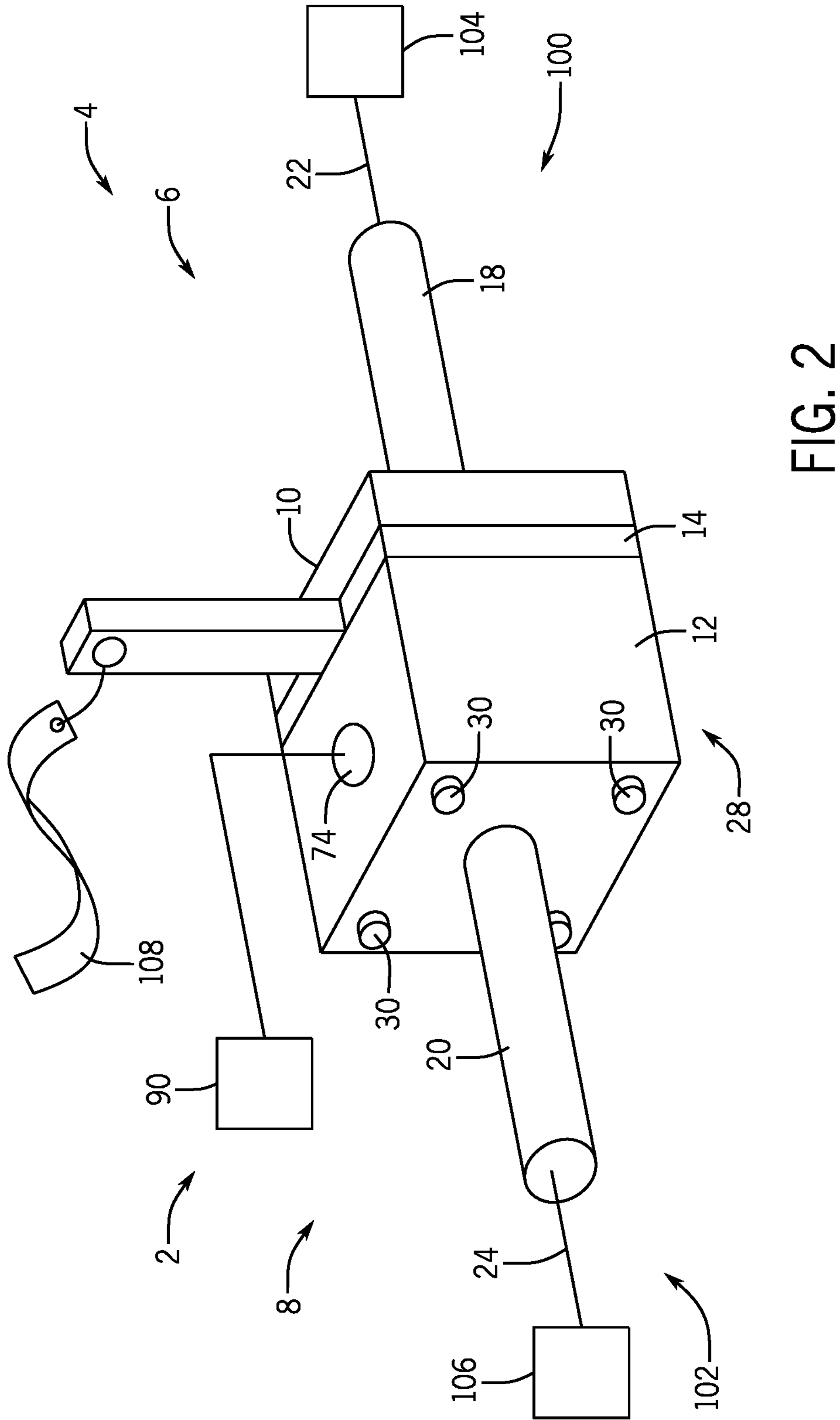
FIG. 2 is a perspective view of a separator system in a second configuration as part of a fluid system according the present subject matter.
Figure 3:
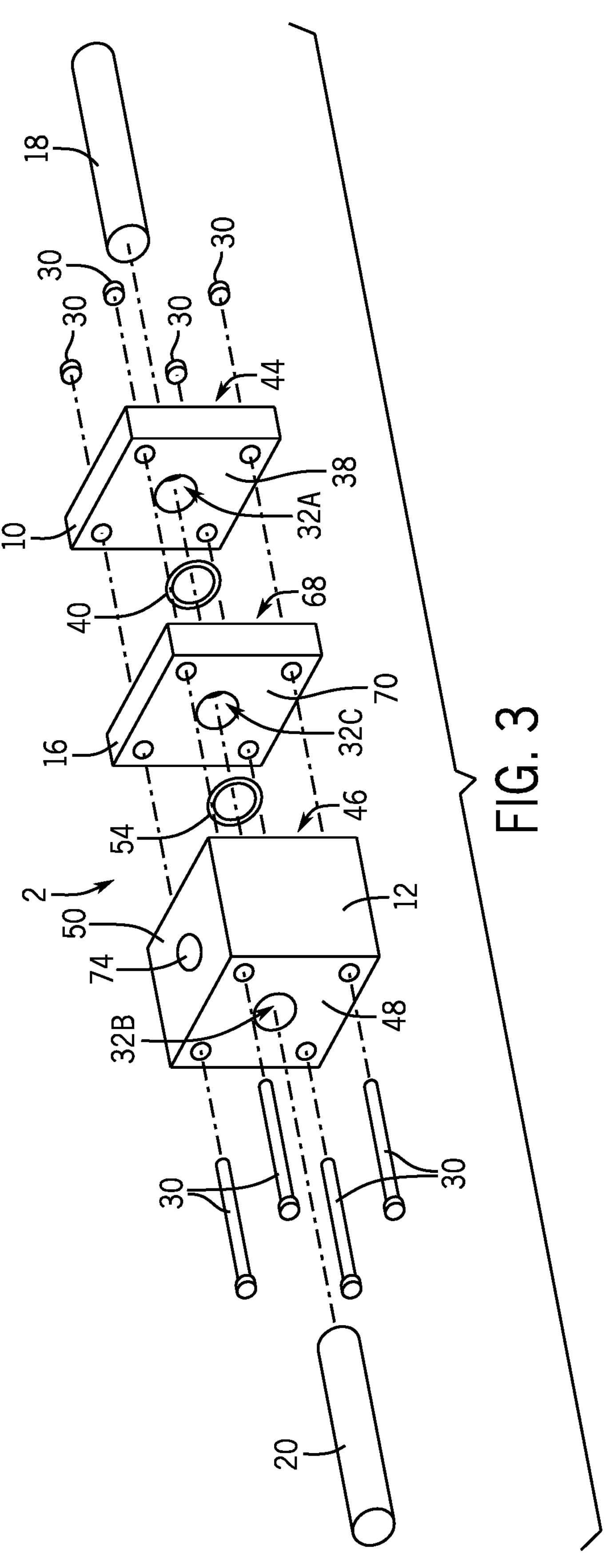
FIG. 3 is an exploded view of a separator system in a first configuration according the present subject matter.
Figure 4:
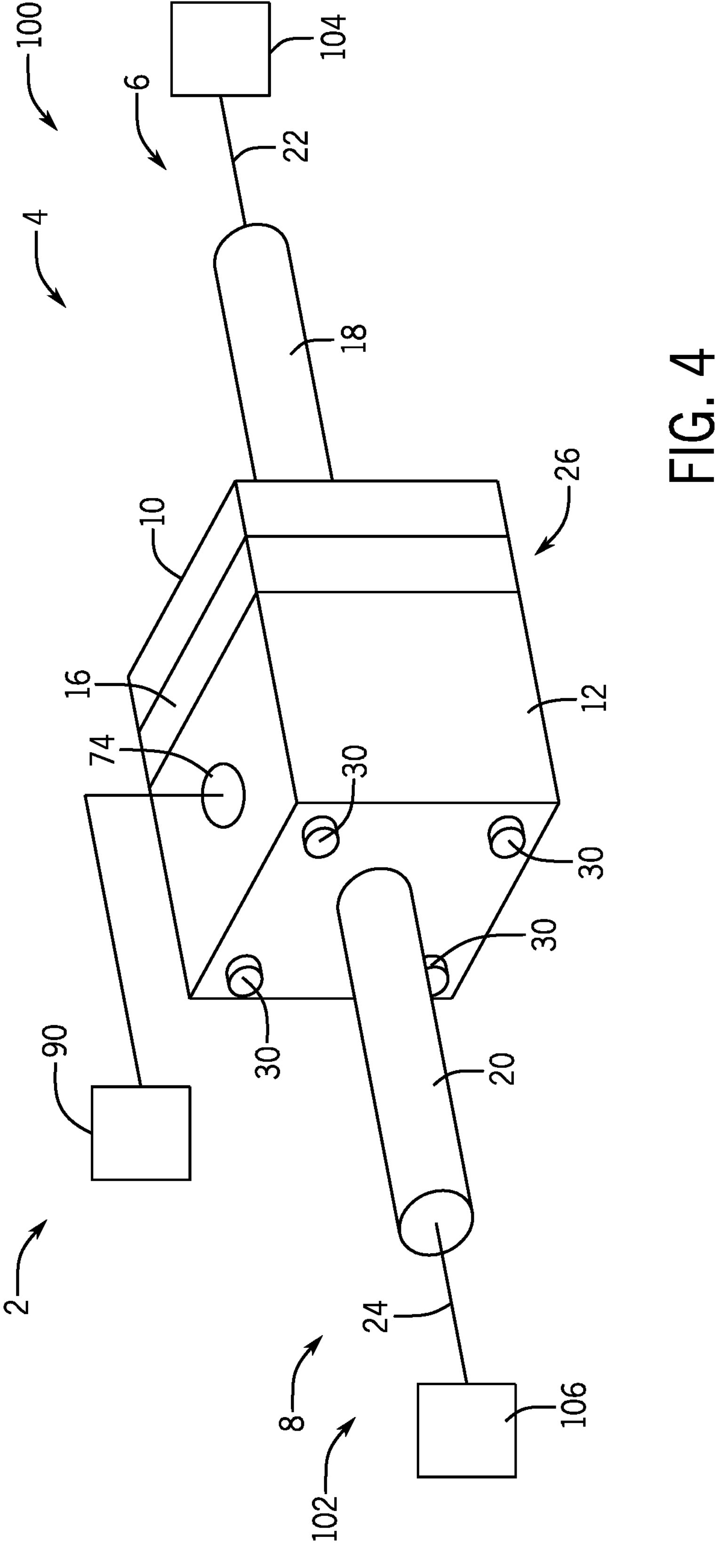
FIG. 4 is a perspective view of a separator system in a first configuration as part of a fluid system according the present subject matter.

The separator system 2 is convertible between a first configuration (FIG. 4, referred to herein as "service configuration") and a second configuration (FIG. 2, referred to herein as "blanking configuration").

When connected to the fluid system 4 and whether in the first configuration or the second configuration, the separator system 2 is arranged fluidly between the upstream portion 6 and the downstream portion 8 of the fluid system 4. When in the first configuration and connected to the fluid system 4, the separator system 2 fluidly connects the upstream portion 6 and the downstream portion 8 so they are in fluid communication with each other through the separator system 2, and thus the first configuration is referred to as a "fluid connector" or a "medical gas connector" 26. After the separator system 2 is installed in the fluid system 4, the separator system 2 may be kept in the first configuration so that the fluid system 4 is operational to deliver the fluid from the upstream portion 6 to the downstream portion 8.

When in the second configuration and connected to the fluid system 4, the separator system 2 fluidly separates the upstream portion 6 and the downstream portion 8 so they are not in fluid communication with each other through the separator system 2, and thus the second configuration is referred to as a "fluid separator" or a "medical gas separator" 28. Said differently, the upstream element 10, the blanking element 14, and the downstream element 12 are connected to form the fluid separator, wherein any fluid flowing in the upstream portion 6 and/or downstream portion 8 are blocked by the blanking element 14 from flowing through the second configuration, since the blanking element 14 is a barrier and blocks the flow.

The separator system 2 may be installed in the fluid system 4 and then selectively converted to the second configuration for isolating the downstream portion 8 for leak testing, e.g. by subjecting the downstream portion 8 with $N_2$ at 150 PSI for 24 hours. After such testing, the separator system 2 can be converted back to the first configuration so that the fluid system 4, including the upstream portion 6 and the downstream portion 8 can be used to deliver service fluid, i.e. service gas such as $O_2$, to a gas outlet.

The first configuration includes, in a direction from an upstream side 100 to a downstream side 102 of the separator system 2, the optional upstream braze tail 18, the upstream element 10, the spacer element 16, the downstream element 12, and optionally the downstream braze tail 20. These components may be attached together by fasteners 30 extending through the upstream element 10, the spacer element 16, and the downstream element 12 along a direction between the upstream side 100 to the downstream side 102 of the separator system 2 as shown in the drawings. The first configuration may be used when the fluid system 4 is in normal use, e.g. for the delivery of service gas through the fluid system 4 from the upstream portion 6 to the downstream portion 8.

The second configuration includes, in a direction from the upstream side 100 to the downstream side 102, the optional upstream braze tail 18, the upstream element 10, the blanking element 14, the downstream element 12, and optionally the downstream braze tail 20. These components may be attached together by the fasteners 30 extending through the upstream element 10, the blanking element 14, and the downstream element 12 along a direction between the upstream side 100 to the downstream side 102 of the separator system 2 as shown. The second configuration may be used when downstream portion 8 of the fluid system 4 is being tested for leaks, after which the separator system 2 can be converted (back) to the first configuration.

Upstream Element

The upstream element 10 is included as part of the separator system 2 in the first configuration and in the second configuration. The upstream element 10 may have a square plate shape as shown in the figures, including an upstream face 44 and an oppositely arranged downstream face 38 as its two major surfaces. This square plate shape is not required however, and the upstream element 10 may have other configurations.

The upstream element 10 is connected, optionally directly or via the upstream braze tail 18, to an upstream pipe 22 of the upstream portion 6 of the fluid system 4. The upstream pipe 22 may have a diameter of ½", ¾", or even up to 6" or 8" or bigger or smaller. The upstream element 10 includes a fluid conduit 32A ("first fluid conduit) extending through the upstream element 10 from the upstream side 100 to the downstream side 102. The fluid conduit 32A may have a diameter of ½", ¾", or even up to 6" or 8" or bigger or smaller to match the size of the pipe in the fluid system 4.

The upstream element 10 may include fastener holes 34A extending through the upstream element 10 from the upstream side 100 to the downstream side 102 and through which the fasteners 30 may be inserted for connecting together the components of the separator system 2 in the first and second configurations.

The upstream element 10 may include an O-ring groove 36 ("first O-ring groove") in its downstream face 38 and in which an O-ring 40 ("first O-ring") or other sealing element is arranged to form a fluid seal around the fluid conduit 32A between the upstream element 10 and the spacer element 16 in the first configuration, and between the upstream element 10 and the blanking element 14 in the second configuration. The O-ring 40 may be adhered to the O-ring groove 36 so as to maintain a proper alignment with the fluid conduit 32A, wherein the O-ring 40 surrounds the fluid conduit 32A at the downstream face 38.

The upstream element 10 may include a braze cup 42 ("first braze cup") on its upstream face 44, in which braze cup 42 an end of one of the upstream pipe 22 or the upstream braze tail 18 (if included) is arranged and brazed to the upstream element 10. The braze cup 42 may provide a proper alignment for the brazing of one of the upstream pipe 22 or the upstream braze tail 18 (if included) to the upstream element 10 around the fluid conduit 32A.

The braze cup 42, O-ring groove 36, fluid conduit 32A, and/or the fastener holes 34A may be formed on/in the upstream element 10 by machining, additive manufacturing, molding, or other techniques, and may be of a single-piece construction with the upstream element 10. The upstream element 10 may be made of various materials, including brass, for example, or other material approved for use in medical gas systems according to a current version of NFPA 99.

The upstream element 10 may be an upstream piece (known as an upstream body adaptor or upstream flange) of a 3-piece ball valve, in which the downstream flange and the middle ball valve body have been removed. The fasteners of the 3-piece ball valve may be used as the fasteners 30 of the separator system 2.

Downstream Element

The downstream element 12 is included as part of the separator system 2 in the first configuration and in the second configuration. The downstream element 12 may have a cuboid shape as shown in the figures, including an upstream face 46, an oppositely arranged downstream face 48, and four side faces extending between the upstream face 46 and downstream face 48. This cuboid shape is not required however, and the downstream element 12 may have other configurations.

The downstream element 12 is connected, optionally directly or via the downstream braze tail 20, to a downstream pipe 24 of the downstream portion 8 of the fluid system 4. The downstream pipe 24 may have a diameter of ½", ¾", or even up to 6" or 8" pipe or bigger or smaller. The downstream element 12 includes a fluid conduit 32B ("second fluid conduit") extending through the downstream element 12 from the upstream side 100 to the downstream side 102. The fluid conduit 32B may have a diameter of ½", ¾", or even up to 6" or 8" pipe or bigger or smaller to match the size of the pipe in the fluid system 4.

The downstream element 12 may include fastener holes 34B extending through the downstream element 12 from the upstream side 100 to the downstream side 102 and through which the fasteners 30 may be inserted for connecting together the components of the separator system 2 in the first and second configurations.

The downstream element 12 may include an O-ring groove 52 ("second O-Ring groove") in its upstream face 46 and in which an O-ring 54 ("second O-ring") or other sealing element is arranged to form a fluid seal around the fluid conduit 32B between the downstream element 12 and the spacer element 16 in the first configuration, and between the downstream element 12 and the blanking element 14 in the second configuration. The O-ring 54 may be adhered to the O-ring groove 52 so as to maintain a proper alignment with the fluid conduit 32B, wherein the O-ring 54 surrounds the fluid conduit 32B at the upstream face 46.

The downstream element 12 may include a braze cup 56 ("second braze cup") on its downstream face 48, in which braze cup 56 an end of one of the downstream pipe 24 or the downstream braze tail 20 (if included) is arranged and brazed to the downstream element 12. The braze cup 56 may provide a proper alignment for the brazing of one of the downstream pipe 24 or the downstream braze tail 20 (if included) to the downstream element 12 around the fluid conduit 32B.

The downstream element 12 may include a blind hole 74 fluidly connected to the fluid conduit 32B. The blind hole 74 may extend in from one of the four side faces (e.g. a top face 50) and terminate at the fluid conduit 32B. The blind hole 74 may be threaded, e.g. ⅛" NPT tapped, for connecting a plug, inline pressure gauge, a pressure/gas testing device, or a purge rig to the downstream element 12. In the first configuration, the blind hole 74 may be fluidly sealed with a plug that is threaded into the blind hole 74. This configuration allows the service gas to be transported through the fluid conduit 32B from the supply side 6 to the patient side 8 while the plug inhibits the service gas from leaking from the fluid conduit 32B and out of the blind hole 74. In the second configuration, the inline pressure gauge, pressure/gas testing device or purge rig 90 may be connected to the blind hole, thus providing fluid communication between such pressure/gas testing device or purge rig and the fluid conduit 32B, which may allow for the delivery of as test fluid, i.e. test gas such as $N_2$, into the patient side 8.

The braze cup 56, O-ring groove 52, fluid conduit 32A, the fastener holes 34A, and/or the blind hole 74 may be formed on/in the downstream element 12 by machining, additive manufacturing, molding, welding, or other techniques, and may be of a single-piece or multi-piece construction with the downstream element 12. The downstream element 12 may be made of various materials, including brass, for example, or other materials approved for use in medical gas systems according to a current version of NFPA 99.

Blanking Element

The blanking element 14 is included as part of the separator system 2 in the second configuration. The blanking element 14 may have a plate shape body 58, which is generally square, and with a handle 60 extending away from the body 58 as shown in the figures, and includes an upstream face 62 and an oppositely arranged downstream face 64 as its two major surfaces, both of which may be identical. This plate shape body and handle are not required however, and the blanking element 14 may have other configurations.

The blanking element 14 may include fastener holes 34C extending through the blanking element 14 from the upstream side 100 to the downstream side 102 and through which the fasteners 30 may be inserted for connecting together the components (upstream element 10, downstream element 12, blanking element 14, spacer element 16) of the separator system 2 in the second configuration.

The blanking element 14 does not include a fluid conduit, and thus when used in the second configuration, blocks a flow of fluid through the separator system 2, between the upstream portion 6 and the downstream portion 8 of the fluid system 4. Such fluid flow blocking can allow for pressure testing or other testing of the downstream portion 8.

When connected by the fasteners 30 in the second configuration, the upstream face 62 of the blanking element 14 may provide a suitable surface against which the O-ring 40 can form a fluid seal around the fluid conduit 32A between the upstream element and the blanking element. Such fluid seal may be formed by the fasteners 30 compressing the O-Ring 40 between the upstream face 62 of the blanking element 14 and the O-Ring groove 36 of the upstream element 10.

When connected by the fasteners 30 in the second configuration, the downstream face 64 of the blanking element 14 may provide a suitable surface against which the O-ring 54 can form a fluid seal around the fluid conduit 32B between the downstream element and the blanking element. Such fluid seal may be formed by the fasteners 30 compressing the O-ring 54 between the downstream face 64 of the blanking element 14 and the O-ring groove 52 of the downstream element 12.

The upstream face 62 and the downstream face 64 may be flat and smooth to provide this sealing performance with the O-rings 40, 54. The upstream face 62 and the downstream face 64 may have a circular groove in with the O-rings 40, 54 can be arranged and for the seal. Consequently by such sealing, fluid in the upstream portion 6, e.g. $O_2$ service gas at 50 PSI, is inhibited from passing through the blanking element and is sealed from exiting the fluid conduit 32A in a downstream direction by the blanking element 14 and O-ring 40 sealed to the upstream face 62 of the blanking element 14. Fluid in the downstream portion 8, e.g. $N_2$ test gas at 150 PSI, is inhibited from passing through the blanking element and is sealed from exiting the fluid conduit 32B in an upstream direction by the blanking element 14 and O-ring 54 sealed to the downstream face 64 of the blanking element 14.

The handle 60 of the blanking element 14 may include a through hole 66 or other connection mechanism for connecting a visual indicator 108, such as a high-visibility ribbon, to the blanking element 14 so as to provide a visual indication that the blanking element 14 is being used in the separator system 2 and thus fluid flow through the separator system 2 between the upstream portion 6 and the downstream portion 8 is blocked by the blanking element 14. The handle 60 may include other visual indicators, including a light source, for example.

The length of the handle 60 may also function to inhibit a cover from being placed over the separator system 2 when in the second configuration, thus providing even more visual indication that the separator system 2 is in the second configuration. For example, the separator system 2 may be installed above a drop ceiling, in which a tile of the drop ceiling is removed to access the separator system 2. When put into the second configuration, the handle 60 may extend below a level of the drop ceiling, thus inhibiting the ceiling tile from being re-installed in the drop ceiling and providing a further visual indication that the separator system 2 in in the second configuration.

The blanking element 14 may be made of various materials, including brass, for example, or other materials approved for use in medical gas systems according to a current version of NFPA 99

Spacer Element

The spacer element 16 is included a part of the separator system 2 in the first configuration. The spacer element 16 may have a square plate as shown in the figures, similar to the upstream element 10 but without the O-ring groove 36 and braze cup 42, and includes an upstream face 68 and an oppositely arranged downstream face 70 as its two major surfaces, both of which may be identical. This square plate shape is not required however, and the spacer element 16 may have other configurations.

The spacer element 16 may include fastener holes 34D extending through the spacer element 16 from the upstream side 100 to the downstream side 102 and through which the fasteners 30 may be inserted for connecting together the components (upstream element 10, downstream element 12, blanking element 14, spacer element 16) of the separator system 2 in the first configuration.

The spacer element 16 includes a fluid conduit 32C ("third fluid conduit"), which in the first configuration fluidly connects the first and second fluid conduits 32A-B, and thus allows a flow of fluid through the blanking element 14 and thus through the separator system 2 in the first configuration. This fluid flow can allow for the delivery of service gas from the upstream portion 6 to the downstream portion 8 of the fluid system 4. The fluid conduit 32C may have a diameter of ½", ¾", or even up to 6" or 8" pipe or bigger or smaller to match the size of the pipe in the fluid system 4.

When connected by the fasteners 30 in the first configuration, the upstream face 68 of the spacer element 16 may provide a suitable surface against which the O-ring 40 can form a fluid seal around the fluid conduits 32A, 32C. Such fluid seal may be formed by the fasteners 30 compressing the O-ring 40 between the upstream face 68 of the spacer element 16 and the O-ring groove 36 of the upstream element 10.

When connected by the fasteners 30 in the first configuration, the downstream face 70 of the spacer element 16 may provide a suitable surface against which the O-ring 54 can form a fluid seal around the fluid conduits 32B, 32C. Such fluid seal may be formed by the fasteners 30 compressing the O-ring 54 between the downstream face 70 of the spacer element 16 and the O-ring groove 52 of the downstream element 12.

The upstream face 68 and the downstream face 70 may be flat and smooth to provide this sealing performance with the O-rings 40, 54. Consequently, fluid (service gas) flowing from the supply side 6 to the patient side 8 will may not leak out of the separator system 2 and past the O-rings 40, 54 between the spacer element 16 and the upstream and downstream elements 10, 12.

The spacer element 16 may be made of various materials, including brass, for example, or other materials approved for use in medical gas systems according to the current version of NFPA 99

Braze Tails

If included, the upstream braze tail 18 can be connected to an upstream pipe 22 of the supply side 6 of the medical gas system 4, and to the upstream element 10 at its braze cup 42. If included, the downstream braze tail 20 can be connected to the downstream pipe 24 of the patient side 8 of the medical gas system 4, and to the downstream element 12 at its braze cup 56.

The braze tails 18, 20 are pipes, which allow for the fluid (e.g. gas) of the fluid system 4 to flow through them. The braze tails 18, 20 may be of any length, e.g. six inches or longer or shorter. The braze tails 18, 20 may be provided integral with the respective upstream element 10 and downstream element 12 as single piece components. The braze tails 18, 20 may be made integrally a part of the respective upstream element 10 and downstream element 12 by various processes, including brazing, machining, additive manufacturing, molding, welding, or other techniques, and may be of a single-piece or multi-piece construction with the respective upstream element 10 and downstream element 12. The braze tails 18, 20 may be included for connection by brazing with the respective upstream pipe 22 and downstream pipe 24. The braze tails 18, 20 may have smaller masses than the upstream element 10 and downstream element 12, and therefore may heat up faster during a brazing process than would the more-massive upstream element 10 and downstream element 12, and thus may make the brazing process easier.

The braze tails 18, 20 may be made of various materials, including brass, for example, or other materials approved for use in medical gas systems according to a current version of NFPA 99.

Fasteners

The fasteners 30 are not particularly limited, and may include screws, bolts, rivets, nuts, other fasteners, or combinations thereof that can selectively attach the components (upstream element 10, downstream element 12, blanking element 14, spacer element 16) of the separator system 2 together in the first and second configurations. When operatively arranged in the fastener holes 34A-D, the fasteners 30 may exert a clamping force to clamp/squeeze the components (upstream element 10, downstream element 12, blanking element 14, spacer element 16) together.

The fastener holes 34A-D are shown to be arranged on each corner of the respective upstream element 10, downstream element 12, blanking element 14, and spacer element 16, and are arranged radially outward from the respective fluid conduit 32A-C, are evenly spaced at regular intervals around the circumference of the respective upstream element 10, downstream element 12, blanking element 14, and spacer element 16. As shown in the figures, the fastener holes 34A-D are arranged at each corner of the respective upstream element 10, downstream element 12, blanking element 14, and spacer element 16, and thus may provide even clamping force for the components of the separator system 2.

The fastener holes 34A-D may be differently arranged and there may be more or less fastener holes and thus more or less fasteners used, so long as the upstream element 10, downstream element 12, blanking element 14, and spacer element 16 are adequately clamped by the fasteners 30.

When the separator system 2 is in the first configuration to form the medical gas connector 26, the fasteners 30 may exert a compression force to squeeze together the upstream element 10, the downstream element 12, and the spacer element 16, and may compress the O-rings 40, 54 therebetween to form seals between these components. Inserting the fasteners 30 through the fastener holes 34A, 34B, 34D may cause the fluid conduits 32A, 32B, 32C in each of the respective upstream element 10, downstream element 12, and spacer element 16 to coaxially align with each other so as to collectively form a continuous fluid aperture (including the fluid conduits 32A, 32B, 32C) extending through the first configuration of the separator system 2 (medical gas connector 26) from the upstream side 100 to the downstream side 102, and through which the fluid (e.g. gas) passes through the continuous fluid aperture.

When the separator system 2 is in the second configuration, e.g. to form the medical gas supply separator 28, the fasteners 30 may exert a compression force to squeeze together the upstream element 10, the downstream element 12, and the blanking element 14, and may compress the O-rings 40, 54 therebetween to form seals between these components. Inserting the fasteners 30 through the fastener holes 34A, 34B, 34C may cause the fluid conduits 32A, 32B in each of the respective upstream element 10, downstream element 12 to align with each other and be coaxial with each other. However, since the blanking element 14 does not have a fluid conduit, no fluid can flow through the second configuration of the separator system 2 (medical gas supply separator 28) between the upstream side 100 and the downstream side 102, and thus the upstream side 100 and the downstream side 102 are fluidly isolated from each other by the second configuration of the separator system 2.

The shape of the components (upstream element 10, downstream element 12, blanking element 14, spacer element 16) of the separator system 2 are shown as having a shape that in cross section is generally square. However, this is not required and the shape of the components is not particularly limited so long as the fluid is sealed inside the conduits when the components are connected together by the fasteners 30.

As shown in the figures, the upstream element 10, downstream element 12, blanking element 14, and spacer element 16 each have a square shape when viewed from the upstream side 100 and downstream side 102. This is not required however, and these components can be other shapes when viewed from the upstream side 100 and downstream side 102, including circle, triangle, oval, rectangle, and other regular or irregular shapes.

Method

A method of operating the fluid transport system 4 may include separating the upstream portion 6 from the downstream portion 8.

The fluid transport system 4 may be separated by cutting, breaking, or otherwise parting the fluid transport system 4 into two parts, i.e. the upstream portion 6 and the downstream portion 8. This may include cutting a pipe of the fluid transport system 4, which may form the upstream pipe 22 and the downstream pipe 24.

The method may include installing the separator system 2 into the fluid system 4 between the upstream portion 6 and the downstream portion 8. This may include arranging the separator system 2 between the upstream portion 6 and the downstream portion 8 and connecting the separator system 2 to the upstream portion 6 and the downstream portion 8.

Connecting the separator system 2 to the upstream portion 6 may include brazing the upstream element 10 to the upstream portion 6, which may include brazing the upstream braze tail 18 to the upstream pipe 22. The upstream braze tail 18 may be brazed onto the upstream portion 6 at the braze cup 42, which brazing may occur either as part of the method or these two components may be provided in this configuration, e.g. from a supplier.

Connecting the separator system 2 to the downstream portion 8 may include brazing the downstream element 12 to the downstream portion 8, which may include brazing the downstream braze tail 20 to the downstream pipe 24. The downstream braze tail 20 may be brazed onto the downstream portion 8 at the braze cup 56, which brazing may occur either as part of the method or these two components may be provided in this configuration, e.g. from a supplier.

The method may include putting the separator system 2 into the second configuration to thereby prevent a fluid within the upstream portion 6 from being transported through the second configuration to the downstream portion 8. Putting the separator system 2 into the second configuration may include arranging the blanking element 14 between the upstream element 10 and the downstream element 12. To arrange the blanking element 14 between the upstream element 10 and the downstream element 12, the spacer element 16, if present, might first be removed from the first configuration, i.e. which may mean the separator system 2 is being converted from the first configuration (with the spacer element 16) to the second configuration (with the blanking element 14). Removal of the spacer element 16 from the first configuration may include loosening the fasteners 30 holding together the first configuration so that the spacer element 16 and/or removing the fasteners 30 from the fastener holes 34A, 34B, 34D, thus making the spacer element 16 free from connections to the upstream element 10 and the downstream element 12, and thus making the spacer element 16 able to be removed from the first configuration. Said differently, the spacer element 16 and the blanking element 14 are removable from the respective first and second configurations and are exchangeable with each other. Thereafter, the blanking element 14 may be arranged between the upstream element 10 and the downstream element 12, which may include using the fasteners 30 to connect together the upstream element 10, blanking element 14, and downstream element 12, which may include inserting the fasteners 30 through the fastener holes 34A, 34B, and 34C and tightening the fasteners 30 so that the fasteners 30 exert a clamping force to clamp the upstream element 10, blanking element 14, and downstream element 12 together. The clamping force may be created by fasteners 30 such as a bolt engaging a nut, or a screw engaging a threaded fastener hole 34, etc.

The method may include, while the separator system 2 is in the second configuration, testing for a presence of leaks in the downstream portion 8 by introducing a test fluid under pressure into the downstream portion 8. This may include introducing $N_2$ gas through the blind hole 74 of the downstream element 12. Such testing may last for 24 hours or more at a pressure of $N_2$ gas of 150 PSI or more. The second configuration offers an air-tight seal at its connection to the downstream portion 8 of the fluid system 4, meaning that the second configuration allows for the pressurization of the downstream portion 8 to 150 PSI or more for accurate leak testing.

The method may include putting the separator system 2 into the first configuration, and then transporting a service fluid (service gas, e.g. including $O_2$) from the upstream portion 6, through the first configuration, to the downstream portion 8. This may include converting the separator system 2 from the second configuration to the first configuration, which may be performed after the leak testing is complete. This may include removing or loosening the fasteners 30 holding the second configuration together, removing the blanking element 14, and replacing it with the spacer element 16, inserting the fasteners 30 through the fastener holes 34A, 34B, 34D and tightening the fasteners 30 to make the first configuration air tight, meaning that the fluid system 4 can be pressurized to 50 PSI or more without significant gas leaks out of the first configuration.

The method may be performed on any fluid transport system 4, including a medical gas supply system, wherein the test fluid includes nitrogen gas, and the service fluid includes oxygen gas.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A medical gas system comprising:

a separator system including an upstream element including a first fluid conduit, a downstream element including a second fluid conduit, a spacer element including a third fluid conduit, a blanking element separate and distinct from the spacer element, and fasteners;

an upstream portion;

a downstream portion;

a plug; and a gas testing device;

wherein the separator system is convertible between a first configuration and a second configuration;

wherein the first configuration includes the upstream element, the downstream element, and the spacer element arranged between and connected to the upstream element and the downstream element such that the third fluid conduit fluidly connects the first and second fluid conduits;

wherein the second configuration includes the upstream element, the downstream element, and the blanking element arranged between and connected to the upstream element and the downstream element such that the blanking element fluidly isolates the first fluid conduit from the second fluid conduit;

wherein in the first configuration, the fasteners extend through respective fastener holes in each of the upstream element, the downstream element, and the spacer element so as to clamp together the upstream element, the downstream element, and the spacer element and coaxially align the first, second, and third fluid conduits with each other; and wherein in the second configuration, the fasteners extend through respective fastener holes in each of the upstream element, the downstream element, and the blanking element so as to clamp together the upstream element, the downstream element, and the blanking element such that the blanking element forms a fluid separator between the first and second fluid conduits;

wherein the upstream element is connected to the upstream portion;

wherein the downstream element is connected to the downstream portion;

wherein the first configuration fluidly connects the upstream portion with the downstream portion;

wherein the second configuration fluidly isolates the upstream portion from the downstream portion;

wherein the downstream element includes a blind hole extending into the downstream element to the second fluid conduit so as to be in fluid communication with the second fluid conduit;

wherein the plug fluidly seals the blind hole when the separator system is in the first configuration;

wherein the gas testing device is connected to the blind hole when the separator system is in the second configuration;

wherein the upstream portion is a supply side of the medical gas system including a medical gas source supplying a medical gas including oxygen; and wherein the downstream portion is a patient side of the medical gas system including a medical gas outlet receiving the medical gas from the medical gas source when the separator system is in the first configuration and not receiving the medical gas from the medical gas source when the separator system is in the second configuration.

2. The medical gas system according to claim 1, further comprising an upstream braze tail brazed to an upstream face of the upstream element, and a downstream braze tail brazed to a downstream face of the downstream element.

3. The medical gas system according to claim 2, wherein:

the upstream element includes a first braze cup on the upstream face;

the downstream element includes a second braze cup on the downstream face:

the upstream braze tail is brazed to the first braze cup; and the downstream braze tail is brazed to the second braze cup.

4. The medical gas system according to claim 1, further comprising a first O-ring arranged in a first O-ring groove on a downstream face of the upstream element, and a second O-ring arranged in a second O-ring groove on an upstream face of the downstream element.

5. The medical gas system according to claim 4, wherein:

in the first configuration, the first O-ring forms a seal between the upstream element and the spacer element, and the second O-ring forms a seal between the downstream element and the spacer element; and in the second configuration, the first O-ring forms a seal between the upstream element and the blanking element, and the second O-ring forms a seal between the downstream element and the blanking element.

6. The medical gas system according to claim 1, wherein the blanking element includes a plate shape body and a handle extending from the plate shape body, and wherein the handle includes a through hole and a visual indicator attached to the handle via the through hole.

7. The medical gas system according to claim 1, further comprising:

an upstream braze tail brazed to the upstream element and connected to the upstream portion; and a downstream braze tail brazed to the downstream element and connected to the downstream portion.

8. A method of operating the medical gas system according to claim 1, the method including:

putting the separator system into the second configuration to thereby prevent a fluid within the upstream portion from being transported through the second configuration to the downstream portion.

9. The method according to claim 8, further including, while the separator system is in the second configuration, testing for a presence of leaks in the downstream portion by introducing a test fluid under pressure into the downstream portion.

10. The method according to claim 9, further including:

putting the separator system into the first configuration; and transporting a service fluid from the upstream portion, through the first configuration, to the downstream portion.

11. The method according to claim 10, wherein the fluid the test fluid includes nitrogen gas, and the service fluid includes oxygen gas.

12. A method of operating the medical gas system according to claim 1, the method including putting the separator system into the first configuration; and transporting a service fluid from the upstream portion, through the first configuration, to the downstream portion.

13. The method according to claim 12, wherein the test fluid includes nitrogen gas and the service fluid includes oxygen gas.

* * * * *